US006869327B2

(12) United States Patent
György et al.

(10) Patent No.: US 6,869,327 B2
(45) Date of Patent: Mar. 22, 2005

(54) METHOD FOR RECOVERING FLUORESCENT MATERIAL FROM FAULTY GLASS BODIES OF DISCHARGE LAMPS

(75) Inventors: Miklós György, Zemplén (HU); Sándor Lukács, Nyár (HU); Erzsébet Cserteg, Erdősor (HU); Erzsébet Tóth, Teleki (HU); Géza Kamenár, Alsótemető (HU)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/818,706

(22) Filed: Mar. 27, 2001

(65) Prior Publication Data

US 2002/0063509 A1 May 30, 2002

(51) Int. Cl.[7] .................................................. H01J 9/50
(52) U.S. Cl. ................................ 445/2; 445/61; 241/99
(58) Field of Search ........................... 445/2, 61; 241/99

(56) References Cited

U.S. PATENT DOCUMENTS

| 3,864,273 A | * | 2/1975 | Forbes et al. | 252/301.4 R |
| 4,952,185 A | * | 8/1990 | Lee | 445/2 |
| 4,974,616 A | * | 12/1990 | Lee | 134/1 |
| 5,106,598 A | * | 4/1992 | Cogar | 423/99 |
| 5,580,006 A | * | 12/1996 | Hennenfent et al. | 241/159 |
| 5,636,800 A | | 6/1997 | Wolf | 241/14 |
| 5,884,854 A | * | 3/1999 | M.ang.nsson et al. | 241/19 |
| 6,042,748 A | * | 3/2000 | Inoue et al. | 252/301.4 S |
| 6,059,206 A | * | 5/2000 | Potts | 241/24.12 |

FOREIGN PATENT DOCUMENTS

EP          0 200 697 A2    11/1986    ............. H01J/9/00

* cited by examiner

Primary Examiner—Kenneth J. Ramsey

(57) ABSTRACT

The invention relates to a method for recovering of fluorescent material from faulty glass bodies (1) of discharge lamps by crushing (11) the lamps, separating and recovering the fluorescent components thereof. The method comprises the steps of breaking the faulty glass bodies (1) in a crusher, removing all metallic component parts if present in the glass bodies (1) by means of electromagnetic separation (13), separating a remaining fraction forming a reusable waste from the broken scrap including glass particles and fluorescent material particles by sieving (15), separating the fluorescent material from the surface of the glass particles in a liquid by washing (19), and obtaining a reusable fluorescent material from the liquid suspension by means of at least one sedimentary deposition (21). The method comprises the step of treating of the remaining fraction by heat for removing the binding material from the fluorescent material if it is necessary.

17 Claims, 3 Drawing Sheets

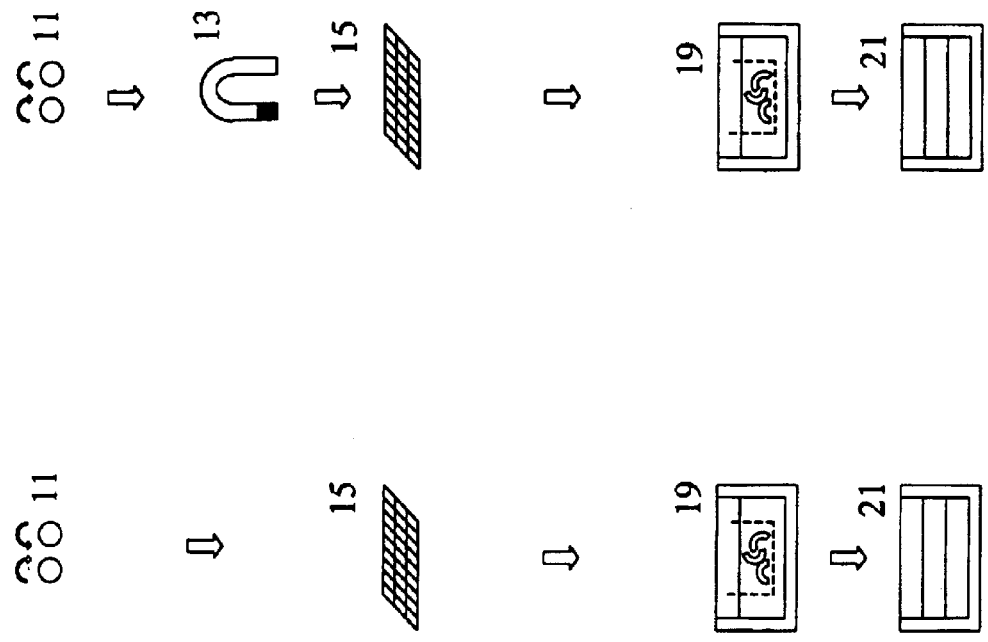

METHOD FOR RECOVERING FLUORESCENT MATERIAL FROM FAULTY GLASS BODIES OF DISCHARGE LAMPS

FIELD OF THE INVENTION

The present invention relates to a method for recovering fluorescent material from faulty glass bodies of discharge lamps, and, more particularly, to a method for recovering the fluorescent material from faulty glass bodies emerging at different stages of the manufacturing process of discharge lamps.

BACKGROUND OF THE INVENTION

During the production of discharge lamps, a certain amount of waste products arises which contains a large variety of expensive rare-earth elements such as yttrium-oxide activated by europium ($Y2O3$:Eu), lanthanum-phosphat activated by cerium and terbium ($LaPO4$:Ce, Tb) and/or barium-magnesium-aluminate activated by europium ($BaMg2Al16O27$:Eu) in the form of a mixture of fluorescent substances as a coating on the inner wall of the glass body.

The general procedure applied in the hitherto customary methods of disposal and recovering is to crush the lamps by mechanical means and then separate the components of the resultant mixture of lamp fragments from one another. The U.S. Pat. No. 5,636,800 describes a process and a device for disposal and recovering of lamp glass, which suggests crushing the lamp bulbs by means of a crusher and then recovering especially the glasses of various types of lamps. This method suffers from the drawback that the fluorescent material of the crushed bulbs is mixed with powdered glass and this disclosure does not describe how the fluorescent material is separated from the powdered glass.

There have, however, also been described a method of recovering fluorescent material especially from linear fluorescent tubes in the European Patent Application EP 0 200 697 A2, wherein the bases of the fluorescent lamp are removed, and then the fluorescent material are loosen mechanically from the inner wall of the bulb by means of a stripping device, which is arranged to be inserted into the bulb from one end thereof. Then a suction device is connected to the other end of the bulb, which removes and collects the luminescent material. As a result of this, it is possible to utilize the individual components of the lamp for disposal at a higher level in that the fluorescent material of the lamp bodies can be reutilized during the manufacture of tubes. However, this process is very laborious since the fluorescent lamps must be charged to the device separately, which will be particularly difficult in the case where not only straight fluorescent tubes but also circular or otherwise curved e.g. compact fluorescent lamp tubes are to be reprocessed.

At the different stages of the process of manufacturing discharge lamps, different kinds of faulty glass bodies emerge. Up to the exhausting stage of the production of fluorescent lamps, the tubes do not contain mercury. Up to this point, it is possible to reprocess the faulty lamp glass bodies rolling out from the production line regardless the need of treating the mercury waste.

Faulty glass bodies emerging at different stages of the lamp manufacturing process require different treatment of recovering. Just after coating the inner wall of the glass bodies with fluorescent material, the coating suspension contains binding material too, which has to be removed from the suspension during recovery. At another stage of the lamp making process, the coating is burned out properly, so it does not contain binding material any more. Finally, just before the exhausting of the glass bodies, they are sealed and provided with lead-in wires and tungsten coils coated with emission material.

Thus, there is a particular need to provide an easy and economic process, by which a high-level recovery of the fluorescent material of the faulty lamps is possible taking into consideration the different kind of faulty glass bodies emerging at different stages of the lamp making process.

SUMMARY OF THE INVENTION

An aspect of the present invention therefore relates to a method for recovering fluorescent material from faulty glass bodies of discharge lamps taken from the production line just before burning out the fluorescent coating. The glass body has a glass envelope and a coating of fluorescent material on the surface of the glass envelope. The fluorescent material includes binding material. An exemplary embodiment of the method comprises the steps of breaking the faulty glass bodies in a crusher; separating a remaining fraction forming a reusable waste from the broken scrap including glass particles and fluorescent material particles by sieving; treating of the remaining fraction by heat for removing the binding material from the fluorescent material; separating the fluorescent material from the surface of the glass particles in a liquid by washing; and obtaining a reusable fluorescent material from the liquid suspension by means of at least one sedimentary deposition.

Another aspect of the invention relates to a method for recovering fluorescent material from faulty glass bodies of discharge lamps taken from the production line just after burning out the fluorescent coating. The glass body has a glass envelope and a coating of fluorescent material on the surface of the glass envelope. An exemplary embodiment of the method comprises the steps of breaking the faulty glass bodies in a crusher; removing all metallic component parts if present in the glass bodies by means of electromagnetic separation; separating a remaining fraction forming a reusable waste from the broken scrap including glass particles and fluorescent material particles by sieving; separating the fluorescent material from the surface of the glass particles in a liquid by washing; and obtaining a reusable fluorescent material from the liquid suspension by means of at least one sedimentary deposition.

It is an outstanding advantage of the present invention that it permits to accomplish an optimum separation of the fluorescent material of the discharge lamps, which consists of expensive rare-earth materials, so that these rare-earth materials can be recycled in the lamp manufacturing process. In order to achieve an efficiently good result, we crush the glass bodies to as large pieces of scrap as it is possible.

BRIEF DESCRIPTION OF THE DRAWINGS

In the following, the invention will be described in detail by means of drawings. In the drawings.

FIG. 4 is a flow chart of a recovering process of faulty rod-shaped fluorescent lamps taken from the production line just after coating by the suspension of fluorescent material;

FIG. 5 is a flow chart of a recovering process of faulty rod-shaped fluorescent lamps taken from the production line just after burning out the coating;

FIG. 6 is a flow chart of a recovering process of faulty rod-shaped fluorescent lamps taken from the production line just after sealing the ends of the glass bodies.

DETAILED DESCRIPTION OF THE INVENTION

Figure 1:
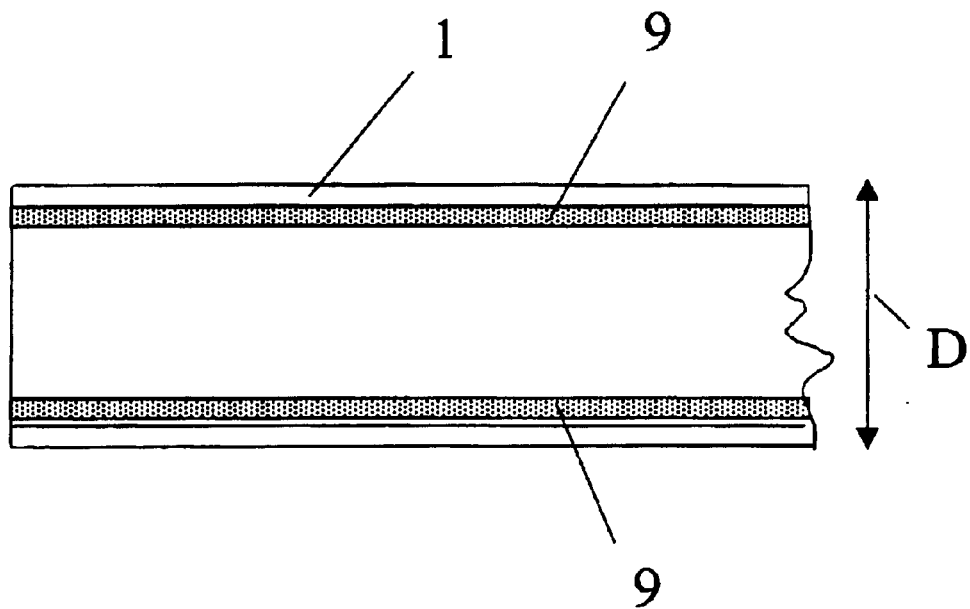
FIG. 1 is a schematic sectional view of a faulty rod-shaped fluorescent lamp taken from the production line just after coating by a suspension of fluorescent material.

Referring now to FIG. 1, that shows an end of a faulty rod-shaped fluorescent lamp taken from the production line just after coating by a suspension of fluorescent material, the fluorescent coating 9 on the inside wall of the glass body 1 comprises binding material beside the fluorescent material in a mixture of suspension. At this stage of the lamp making process, the binding material has not been burned out from the fluorescent coating 9 yet. The fluorescent material itself can be a large variety of expensive rare-earth materials such as yttrium-oxide activated with europium, lanthanum phosphate activated with cerium and terbium and/or barium-magnesium-aluminate activated with europium. The diameter D of glass body 1 is unique at a particular type of fluorescent lamps and the glass body 1 is normally made from soda—lime glass.

Figure 2:
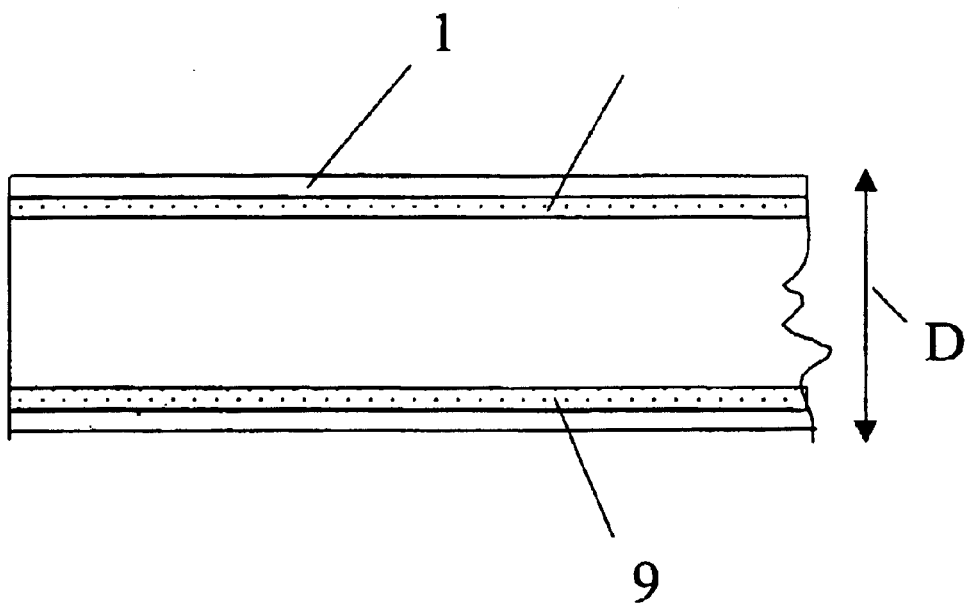
FIG. 2 is a schematic sectional view of a faulty rod-shaped fluorescent lamp taken from the production line just after burning out the coating.

FIG. 2 shows an end of a faulty rod-shaped fluorescent lamp taken from the production line just after burning out the fluorescent coating 9. At this stage of the lamp making process, the fluorescent coating 9 does not comprise binding material, but a large variety of rare-earth materials mentioned above.

Figure 3:
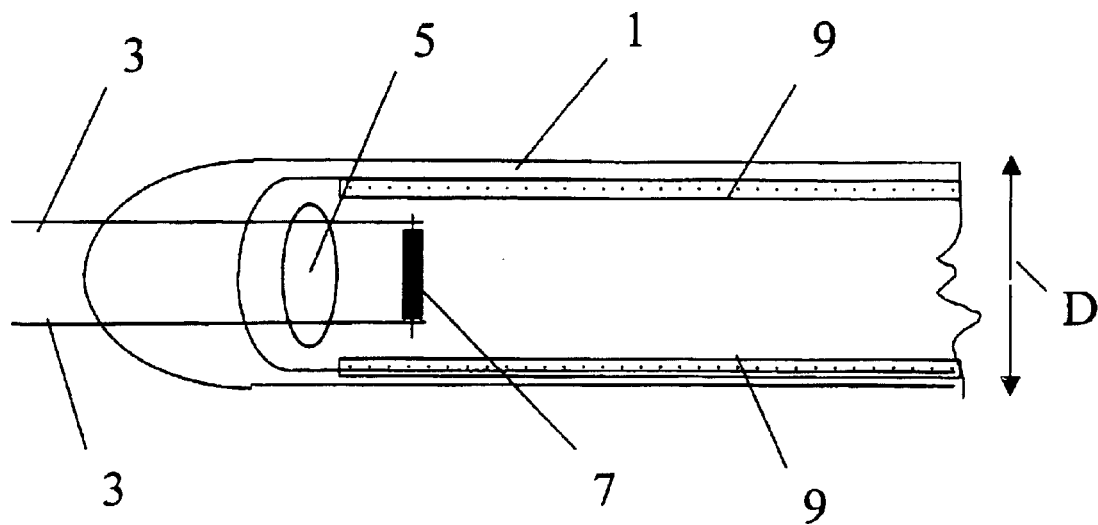
FIG. 3 is a schematic sectional view of a faulty rod-shaped fluorescent lamp taken from the production line just after sealing the ends of the glass bodies.

FIG. 3 is an end of a faulty rod-shaped fluorescent tube taken from the production line just after sealing. The end of the glass body 1 is pinched-sealed and two lead-in wires 3 are embedded in a gas-tight manner therein. These lead-in wires 3 are made from an alloy of nickel-iron, carry a tungsten coil 7 and are set apart from each other by a glass support 5. Since the tube is before exhausting, it is free of mercury and discharge gas.

FIG. 4 shows the steps of the recovering process schematically when the faulty glass bodies are taken from the production line before burning out the fluorescent coating 9. The first step is crushing 11 the faulty glass bodies in a crusher. A preferred embodiment of the crusher will be described with reference to FIG. 7. After crushing, the broken fragments consist of glass and fluorescent material on the surface of the glass.

The second step is sieving 15 by which the large pieces of glass particles are retained, while the small pieces fall out. The glass particles of the glass body 1 is separated by means of a shaking sieve to recover, on the one hand the large pieces of glass particles, and on the other hand a mixture of powdered glass. We have carried out experiments to determine an optimal sieve mesh. If the mesh size of the sieve is smaller, a greater amount of glass particles is retained. We have found that the optimum mesh size ranges from 3.0 to 3.5 millimeters. If the mesh size is smaller than 3.0 millimeters (thick mesh), the glass scrap retained in the sieve consists of too small pieces for effective washing. If the mesh size is bigger than 3.5 millimeters (thin mesh) the amount of the scrap, which falls out of the sieve and therefore have to be treated as hazardous material, will be too much.

Since the fluorescent material contains binding material, it is necessary to burn it out in order to make it suitable for washing. In step three, a heating 17 process is applied for removing the binding material. The preferred temperature range of heating is 500–520° C.

The fourth step is a washing 19. This step is preferably performed as an ultrasonic washing process which separates the fluorescent material from the glass. The ultrasonic washing is carried out in a liquid, preferable in water.

The fifth step comprises at least one sedimentary deposition 21 before the fluorescent material can be recycled to the lamp making process. It is preferable to repeat the washing by drawing off the liquid after the first sedimentary deposition 21 and filling up the liquid, depositing, drawing off the liquid repeatedly for removing dirt remaining on the surface of the fluorescent material.

FIG. 5 shows the steps of the recovering process when the faulty glass bodies are taken from the production line just after burning out the fluorescent coating 9. In this case, the recovering process is the same as the process described with reference to FIG. 4 with the exception of heating 17. It is unnecessary to treat the glass bodies to be recovered by heating because, at this stage of the lamp making process, the binding material has already been burned out properly.

FIG. 6 illustrates the steps of the recovering process when the faulty glass bodies are taken from the production line just after sealing the ends of the glass bodies. In this case, the recovering process is similar to the process described with reference to FIG. 5, with the exception of an additional separation of metal components.

After crushing 11 the broken scraps consist of metal components in addition to glass. The metallic components comprise an alloy of nickel-iron lead-in wires 3 with the tungsten coils 7.

In the second step, the metallic components are removed by magnetic separation 13. Since the alloy of nickel-iron is a magnetizable material, the separation can be carried out by passing the scraps through magnetic field. The tungsten coils 7 are not magnetizable but they are attached to the magnetizable alloy of nickel-iron lead-in wires 3, or are cut into so small pieces that will fall out at sieving 15.

The third step is sieving 15, the fourth step is washing 19 and the fifth step is sedimentary deposition 21 as described with reference to FIG. 4.

The tests prove that almost 80–90% of the fluorescent material can be recovered from the faulty glass bodies by the methods described above. The recovered fluorescent material contains a certain amount of glass. The glass content of the recovered fluorescent material is less than 0.2%. In a new lamp making process, the applied fluorescent material can contain a major part of the recovered fluorescent material despite the glass particles in the recovered fluorescent material. It is also proven by the tests that 70% of the applied fluorescent material can be of recovered fluorescent material.

In all of the processes described with reference to FIG. 4, FIG. 5 and FIG. 6, the glass scrap retained in sieving can also be recycled to the lamp making process. The tests show that 99% of the glass can be recycled for producing the so called vitrite components of the electrical lamps. Only the remaining 1% has to be treated as hazardous material. The steps described with reference to FIG. 4, FIG. 5 and FIG. 6 may be completed by additional steps like cooling, transporting, charging, loading and storing, which are well known to the person skilled in the art. In the following, we describe a type of crusher suitable for crushing the glass bodies of the fluorescent lamp.

Figure 7:
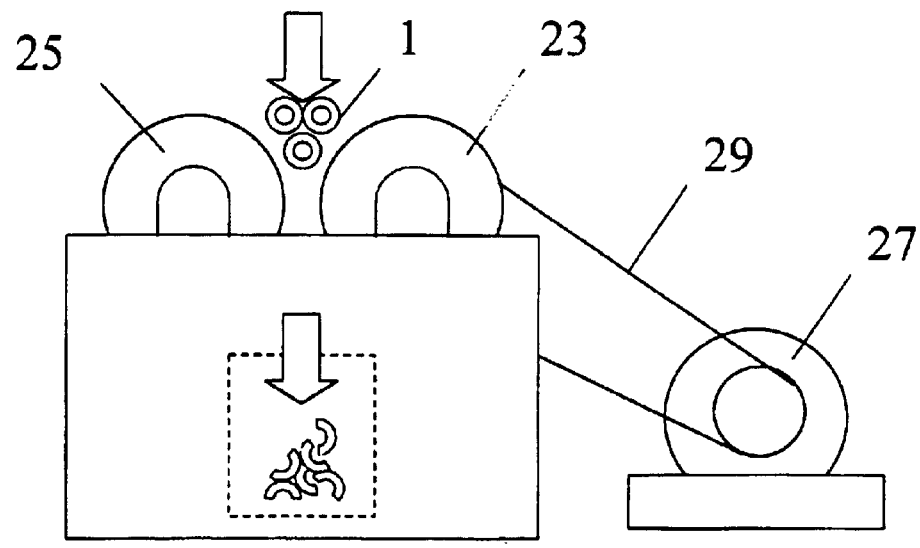
FIG. 7 is a schematic side view of a preferred crusher.

As is shown in FIG. 7, a crusher comprises a double-roller press with an adjustable distance between the two press rollers. One of the press rollers 23 is fixed, while the other press roller 25 is adjustable. The distance between the press rollers is to be adjusted to the diameter D of the glass bodies to be crushed. The fixed roller 23 is driven by a driving system, which consists of an electrical machine 27 and a driving-belt 29 rotating the fixed roller 23 at its circumference. The diameter D of the glass body of the fluorescent tube is larger than the distance between the rollers 23, 25 of the crusher. It is essential, however, that the distance between the press rollers 23, 25 should be smaller than the diameter D of the lamp body 1, so that the crushing of the glass will take place into relatively large pieces. According to the tests, it has been found that the performance is the best when this distance is 0.6–0.9 times the diameter D of the glass body 1. When this distance is smaller than 0.6 D, the crushing process yields too little pieces of glass. On one hand, separating the too little pieces of scrap from the fluorescent material is difficult and the little pieces of glass scrap getting into the recovered fluorescent material may depreciate its optical characteristic. On the other hand, the too little pieces will fall out at the sieving and will be wasted. When the distance is larger than 0.9 D the crushing process will be doubtful.

Of course, the crusher can be of any type, e.g. a type which can be seen in the U.S. Pat. No. 5,636,800 patent specification. Since the diameter D of the glass body 1 is different at different lamp types, the distance between the press rollers 23, 25 should be adjustable.

The method according to the invention is universal, i.e. it can be used for rod-shaped, circular or U-shaped fluorescent lamps too. The major advantage of the invention is a significant cost reduction owing to the recycled fluorescent material and in addition to the recycled glass. Another advantage is the minimized remaining amount of hazardous material.

What is claimed is:

1. A method for recovering fluorescent material from faulty glass bodies of discharge lamps, said glass body having a glass envelope and a coating of fluorescent material including binding material on the surface of the glass envelope, said method comprising the steps of breaking the faulty glass bodies in a crusher; separating a remaining fraction forming a reusable waste from the broken scrap including glass particles and fluorescent material particles by sieving; treating the remaining fraction by heat for removing the binding material from the fluorescent material; separating the fluorescent material from the surface of the glass particles in a liquid by washing; and obtaining a reusable fluorescent material from the liquid suspension by means of at least one sedimentary deposition.

2. The method of claim 1 in which the crusher has press rollers and the distance between the press rollers is equal to 0.6D –0.9D, where D is the diameter of the glass envelope.

3. The method of claim 1 in which the crusher has press rollers and the distance between the press rollers is adjustable.

4. The method of claim 1 in which the mesh size of the sieve used for separating the fraction forming a reusable waste is between 3.0 and 3.5 millimeters.

5. The method of claim 1 in which the fraction remaining after sieving is treated by heat at a temperature of 500–520° C.

6. The method of claim 1 in which the fluorescent material is separated from the surface of the glass particles by ultrasonic washing.

7. The method of claim 1 in which obtaining the reusable fluorescent material from the liquid suspension comprises the steps of drawing off the liquid after the first sedimentary deposition; and filling up the liquid, depositing, drawing off the liquid repeatedly for removing dirt remaining on the surface of the fluorescent material.

8. The method of claim 1 in which the liquid used for separating the fluorescent material from the surface of the glass particles is water.

9. A method for recovering fluorescent material from faulty glass bodies of discharge lamps, said glass body having a glass envelope and a coating of fluorescent material on the surface of the glass envelope, said method comprising the steps of breaking the faulty glass bodies in a crusher; removing all metallic component parts if present in the glass bodies by means of electromagnetic separation; separating a remaining fraction forming a reusable waste from the broken scrap including glass particles and fluorescent material particles by sieving; separating the fluorescent material from the surface of the glass particles in a liquid by washing; and obtaining a reusable fluorescent material from the liquid suspension by means of at least one sedimentary deposition.

10. A method for recovering fluorescent material from faulty glass bodies of discharge lamps, said glass body having a glass envelope and a coating of fluorescent material on the surface of the glass envelope and sealed ends, said method comprising the steps of breaking the faulty glass bodies and ends in a crusher; removing all metallic component parts if present in the glass bodies by means of electromagnetic separation; separating a remaining fraction forming a reusable waste from the broken scrap including glass particles and fluorescent material particles by sieving; separating the fluorescent material from the surface of the glass particles in a liquid by washing; and obtaining a reusable fluorescent material from the liquid suspension by means of at least one sedimentary deposition.

11. The method of claim 10 in which the crusher has press rollers and the distance between the press rollers is equal to 0.6D–0.9D, where D is the diameter of the glass envelope.

12. The method of claim 10 in which the crusher has press rollers and the distance between the press rollers is adjustable.

13. The method of claim 10 in which the mesh size of the sieve used for separating the fraction forming a reusable waste is between 3.0 and 3.5 millimeters.

14. The method of claim 10 in which the fraction remaining after sieving is treated by heat at a temperature of 500–520° C.

15. The method of claim 10 in which the fluorescent material is separated from the surface of the glass particles by ultrasonic washing.

16. The method of claim 10 in which obtaining the reusable fluorescent material from the liquid suspension comprises the steps of drawing off the liquid alter the first sedimentary deposition; and filling up the liquid, depositing, drawing off the liquid repeatedly for removing dirt remaining on the surface of the fluorescent material.

17. The method of claim 10 in which the liquid used for separating the fluorescent material from the surface of the glass particles is water.

\* \* \* \* \*